(12) United States Patent
Dekel et al.

(10) Patent No.: US 12,470,522 B2
(45) Date of Patent: *Nov. 11, 2025

(54) TECHNIQUES FOR PROVIDING A SECURE WEB GATEWAY THROUGH A ZERO TRUST NETWORK ENVIRONMENT

(71) Applicant: HEWLETT PACKARD ENTERPRISE DEVELOPMENT LP, Spring, TX (US)

(72) Inventors: Shachar Dekel, Tel Aviv (IL); Gil Azrielant, Tel Aviv (IL); Oran Gilboa, Tel Aviv (IL); Guy Sviry, Tel Aviv (IL); Yehoshua Haim Chen, Tel Aviv (IL); Shay Farhuma Gutman, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 244 days.

This patent is subject to a terminal disclaimer.

(21) Appl. No.: 18/359,515

(22) Filed: Jul. 26, 2023

(65) Prior Publication Data

US 2025/0039145 A1 Jan. 30, 2025

(51) Int. Cl.
*H04L 9/40* (2022.01)

(52) U.S. Cl.
CPC ...... *H04L 63/0272* (2013.01); *H04L 63/0263* (2013.01); *H04L 63/029* (2013.01); *H04L 63/108* (2013.01)

(58) Field of Classification Search
CPC ............ H04L 63/0272; H04L 63/0263; H04L 63/029; H04L 63/108; H04L 63/083; H04L 63/02; H04L 63/0838; H04L 63/0861; H04L 63/0884; H04L 63/1408; H04L 63/1416; H04L 63/20; H04L 67/02
See application file for complete search history.

(56) References Cited

U.S. PATENT DOCUMENTS

| | | | |
|---|---|---|---|
| 9,525,672 B2 * | 12/2016 | Cignetti | H04L 63/0823 |
| 10,205,657 B2 * | 2/2019 | Chang | H04L 12/4641 |
| 11,074,091 B1 * | 7/2021 | Nayakbomman | G06F 9/455 |
| 11,159,366 B1 * | 10/2021 | Gawade | H04L 41/0895 |
| 11,240,242 B1 * | 2/2022 | Celik | H04L 12/4633 |
| 11,316,822 B1 * | 4/2022 | Gawade | G06F 9/455 |
| 11,470,100 B1 * | 10/2022 | Christian | H04L 63/102 |
| 11,588,859 B2 | 2/2023 | Keiser, Jr. | |
| 11,843,577 B2 | 12/2023 | Singh et al. | |
| 11,902,145 B2 | 2/2024 | Laplante et al. | |
| 11,943,260 B2 | 3/2024 | Narayanaswamy et al. | |
| 12,034,652 B2 | 7/2024 | Henkel et al. | |
| 12,068,958 B1 | 8/2024 | Henkel et al. | |

(Continued)

*Primary Examiner* — J. Brant Murphy
(74) *Attorney, Agent, or Firm* — Hewlett Packard Enterprise Patent Department

(57) ABSTRACT

A system and method for configuring a client device to communicate utilizing a secure web gateway. The method includes generating a virtual network interface having a namespace with a plurality of names, wherein a first name of the namespace is assigned to a client device; assigning a second name of the namespace to a resource accessible to the client device through a zero trust network environment, wherein the resource is deployed in a secure network environment; and configuring the client device to communicate only through the virtual network interface.

21 Claims, 6 Drawing Sheets

(56) References Cited

U.S. PATENT DOCUMENTS

| | | |
|---|---|---|
| 12,101,296 B2 | 9/2024 | Vemulpali |
| 2016/0182473 A1* | 6/2016 | Cignetti ................. G06F 21/44 |
| | | 713/171 |
| 2016/0261496 A1* | 9/2016 | Chang ................. H04L 12/4633 |
| 2019/0141015 A1* | 5/2019 | Nellen ................. H04L 63/0272 |
| 2019/0238365 A1* | 8/2019 | Sudhakaran ........ H04L 61/2592 |
| 2020/0236112 A1* | 7/2020 | Pularikkal ........... H04L 63/1425 |
| 2020/0336466 A1* | 10/2020 | Goldschlag ......... H04L 61/4511 |
| 2022/0075889 A1* | 3/2022 | Friedman ............. G06F 21/6218 |
| 2022/0158926 A1* | 5/2022 | Wennerström .......... H04L 43/20 |
| 2022/0278926 A1* | 9/2022 | Sharma ................. H04L 45/586 |
| 2022/0278927 A1* | 9/2022 | Mariappan ............ H04L 45/745 |
| 2022/0334864 A1* | 10/2022 | K N .......................... G06F 8/61 |
| 2023/0104568 A1* | 4/2023 | Miriyala ................. H04L 45/42 |
| | | 718/104 |
| 2023/0107891 A1* | 4/2023 | Miriyala ............... H04L 41/122 |
| | | 370/254 |
| 2023/0123781 A1* | 4/2023 | Kaimal ................. H04L 9/3247 |
| | | 726/12 |
| 2023/0224167 A1* | 7/2023 | Wang ...................... H04L 63/10 |
| | | 713/158 |
| 2023/0224302 A1 | 7/2023 | Sviri et al. |
| 2023/0224303 A1 | 7/2023 | Sviri et al. |
| 2023/0291726 A1 | 9/2023 | Dekel et al. |
| 2023/0388271 A1 | 11/2023 | Chen et al. |
| 2024/0422107 A1* | 12/2024 | Sharma ............... H04L 41/0806 |

\* cited by examiner

TECHNIQUES FOR PROVIDING A SECURE WEB GATEWAY THROUGH A ZERO TRUST NETWORK ENVIRONMENT

TECHNICAL FIELD

The present disclosure relates generally to secure web gateways and specifically to providing a secure web gateway through a zero trust network environment.

BACKGROUND

Organizations are increasingly allowing users to work both physically within the organization, and outside of it. When outside of the organization, a user will connect to the organization's internal computer network, private cloud network, hybrid, and the like, in order to access resources stored thereon. Often, users will use their own devices in a bring your own device (BYOD) setup. All this leads to security vulnerabilities which can leave the organization exposed.

One of the solutions to combat to limit such expose is by deploying a secure web gateway (SWG). The SWG is configured to connect a user device to a network resource, and additionally perform filtering of content, inspection of content, and apply security controls to network traffic. SWG solutions generate a dedicated network space and connect the user device and, for example, web application which the user device is attempting to access, to the dedicated network space. Therefore, in order to utilize a SWG solution, network resources must be preconfigured in the network space. Furthermore, SWG solutions which are designed as stand-alone applications often do not easily integrate into an organization's workflow, log monitoring, reporting, and the like.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating a virtual network interface having a namespace with a plurality of names, where a first name of the namespace is assigned to a client device. Method may also include assigning a second name of the namespace to a resource accessible to the client device through a zero trust network environment, where the resource is deployed in a secure network environment. Method may furthermore include configuring the client device to communicate only through the virtual network interface. Other embodiments of this aspect include corresponding computer systems, apparatus, and computer programs recorded on one or more computer storage devices, each configured to perform the actions of the methods.

Implementations may include one or more of the following features. Method may include: inspecting network traffic received from the client device; determining a destination of the network traffic; and sending the network traffic to the destination in response to determining that the network traffic is allowable based on a policy of the zero trust network environment. Method may include: altering a packet of the network traffic so that a response from the resource is directed to the zero trust network environment instead of the client device. Method may include: receiving credentials of a user account associated with the user device; providing access to the resource through the zero trust network in response to authenticating the received credentials. Method where the virtual network interface further includes a routing table. Method may include: performing a deep packet inspection on the network traffic. Method where the resource is deployed in any one of: a private network, a public network, and any combination thereof. Method where the resource is any one of: a web application, a remote desktop protocol (RDP) server, a secure shell (SSH) server, a file server, an object database, a transactional database, a SQL database, a NoSQL database, a web server, a data repository, and any combination thereof. Method may include: assigning a third name of the namespace to another resource accessible to the client device through a zero trust network environment, where the resource is deployed in a private network and the another resource is deployed in a public network; and blocking network traffic to the another resource in response to determining that the client device requested content from the resource within a time period which is less than a predefined time period. Method where the zero trust network environment includes any one of: a frontend SSH server, a frontend RDP server, an access portal server, a backend server, and any combination thereof. Implementations of the described techniques may include hardware, a method or process, or a computer tangible medium.

In one general aspect, non-transitory computer-readable medium may include one or more instructions that, when executed by one or more processors of a device, cause the device to: generate a virtual network interface having a namespace with a plurality of names, where a first name of the namespace is assigned to a client device. Medium may furthermore include assigning a second name of the namespace to a resource accessible to the client device through a zero trust network environment, where the resource is deployed in a secure network environment. Medium may in addition include configure the client device to communicate only through the virtual network interface. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: generate a virtual network interface having a namespace with a plurality of names, where a first name of the namespace is assigned to a client device. System may in addition assign a second name of the namespace to a resource accessible to the client device through a zero trust network environment, where the resource is deployed in a secure network environment. System may moreover configure the client device to communicate only through the virtual network interface. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: inspect network traffic received from the client device; determine a destination of the network traffic; and send the network traffic to the destination in response to determining that the network traffic is allowable based on a policy of the zero trust network environment. System where the memory contains further instructions which when executed by the processing circuitry further configure the system to: alter a packet of the network traffic so that a response from the resource is directed to the zero trust network environment instead of the client device. System where the memory contains further instructions which when executed by the processing circuitry further configure the system to: receive credentials of a user account associated with the user device; and provide access to the resource through the zero trust network in response to authenticating the received credentials. System where the virtual network interface further includes a routing table. System where the memory contains further instructions which when executed by the processing circuitry further configure the system to: perform a deep packet inspection on the network traffic. System where the resource is deployed in any one of: a private network, a public network, and any combination thereof. System where the resource is any one of: a web application, a remote desktop protocol (RDP) server, a secure shell (SSH) server, a file server, an object database, a transactional database, a SQL database, a NoSQL database, a web server, a data repository, and any combination thereof. System where the memory contains further instructions which when executed by the processing circuitry further configure the system to: assign a third name of the namespace to another resource accessible to the client device through a zero trust network environment, where the resource is deployed in a private network and the another resource is deployed in a public network; and block network traffic to the another resource in response to determining that the client device requested content from the resource within a time period which is less than a predefined time period. System where the zero trust network environment includes any one of: a frontend SSH server, a frontend RDP server, an access portal server, a backend server, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
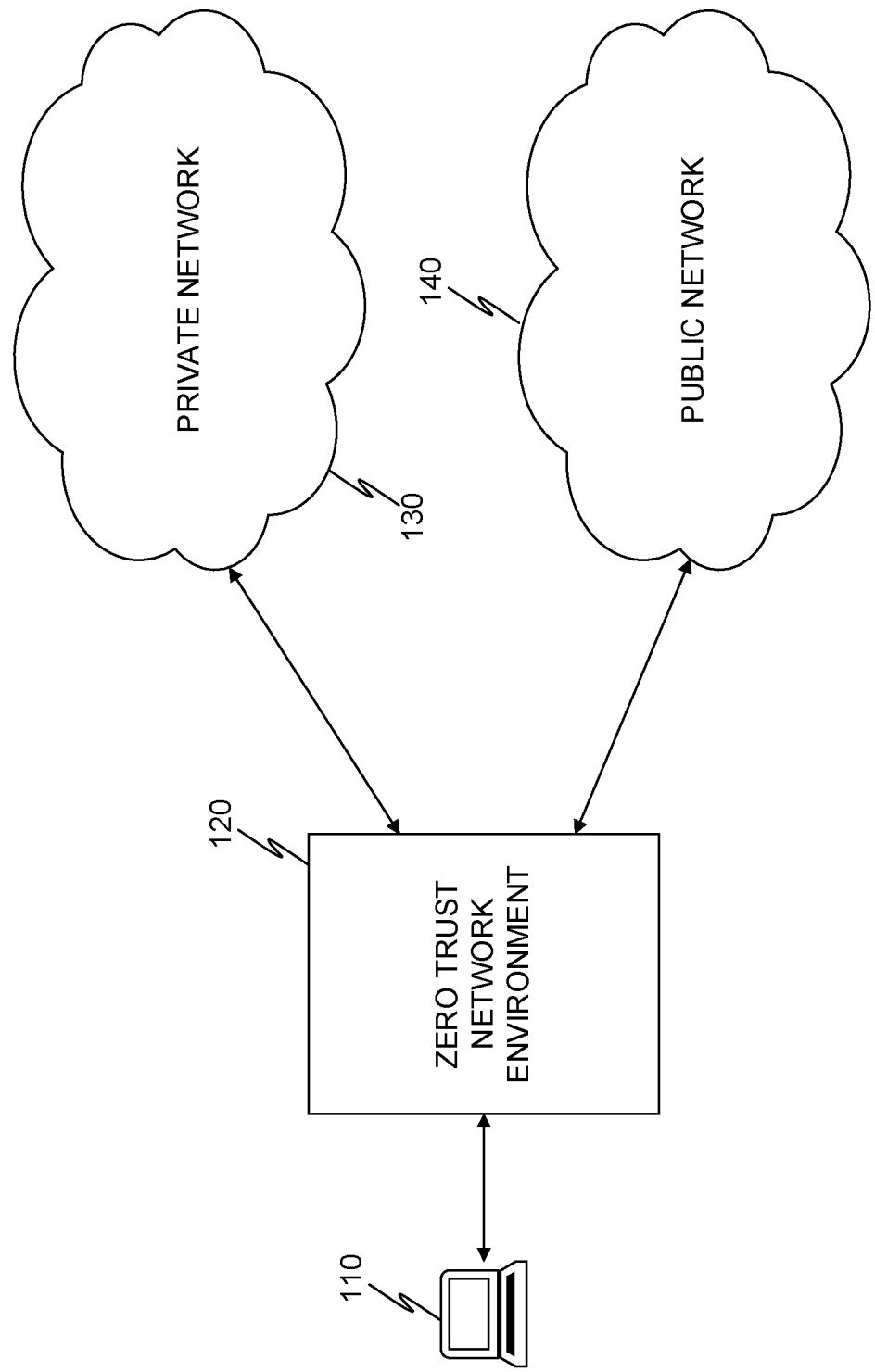
FIG. 1 is an example of a network diagram of a user device communicating with a zero trust network, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a secure web gateway (SWG) over a zero trust network environment. The system configures a client device operated by a user to install an agent on the client device. The agent, when executed on the client device, configures the client device to generate a virtual network interface (VNI). The agent further configures the client device to communicate through the VNI with a zero trust network environment. When the client device requests a network resource, which may be any network resource type, the agent configures the VNI to expose the network resource to the client device as a resource which is accessible through the local network of the VNI. The VNI exposes the client device to a virtual local network, in which various external network resources may be represented as though they are local resources in the virtual local network. Utilizing this method, all communication from the user device is always passed through the zero trust network, allowing a user device to connect to both a secure network, and authorized public network access. By not requiring a virtual private network (VPN) to connect a user device and a web application, resources which are outside of the VPN can also be exposed to the user device.

FIG. 1 is an example of a network diagram of a user device communicating with a zero trust network, utilized to describe an embodiment. A user device 110, discussed in more detail in FIG. 2 below, is communicatively connected to a zero trust network environment 120. The user device 110 may be, for example, a personal computer device, a laptop, a tablet, and the like. In an embodiment, the zero trust network (ZTN) environment 120 is implemented as a virtual private cloud (VPC) on a cloud computing environment. A cloud computing environment may be, for example, Amazon® Web Services (AWS), Microsoft® Azure, Google® Cloud Platform (GCP), and the like. An example of a ZTN environment 120 is discussed in more detail in FIG. 3 below.

The ZTN environment 120 provides connectivity to a private network 130, and a public network 140. The user of the user device 110 and the private network 130 belong to the same organization, in this example. In other embodiments, the user (i.e., user account) is otherwise permitted to access the private network 130. In an embodiment, the private network 130 may be implemented as a VPC on a public cloud, such as AWS, accessible over the public network 140. The public network 140 may be, for example, the Internet. The public network 140 is generally accessible to any user, while the private network 130 is limited in access only to authorized users, providing credentials which may be authenticated, for example through the zero trust network environment 120.

In certain embodiments, a connector application may be deployed in the private network 130 to facilitate communication between resources of the private network 130, and a backend server (shown in FIG. 3) of the zero trust network environment 120. A resource of the private network 130 may be, for example, an RDP server, an SSH server, a file server, an object database, a transactional database, a SQL database, a NoSQL database, a web server, a data repository, a web application, and the like.

Figure 2:
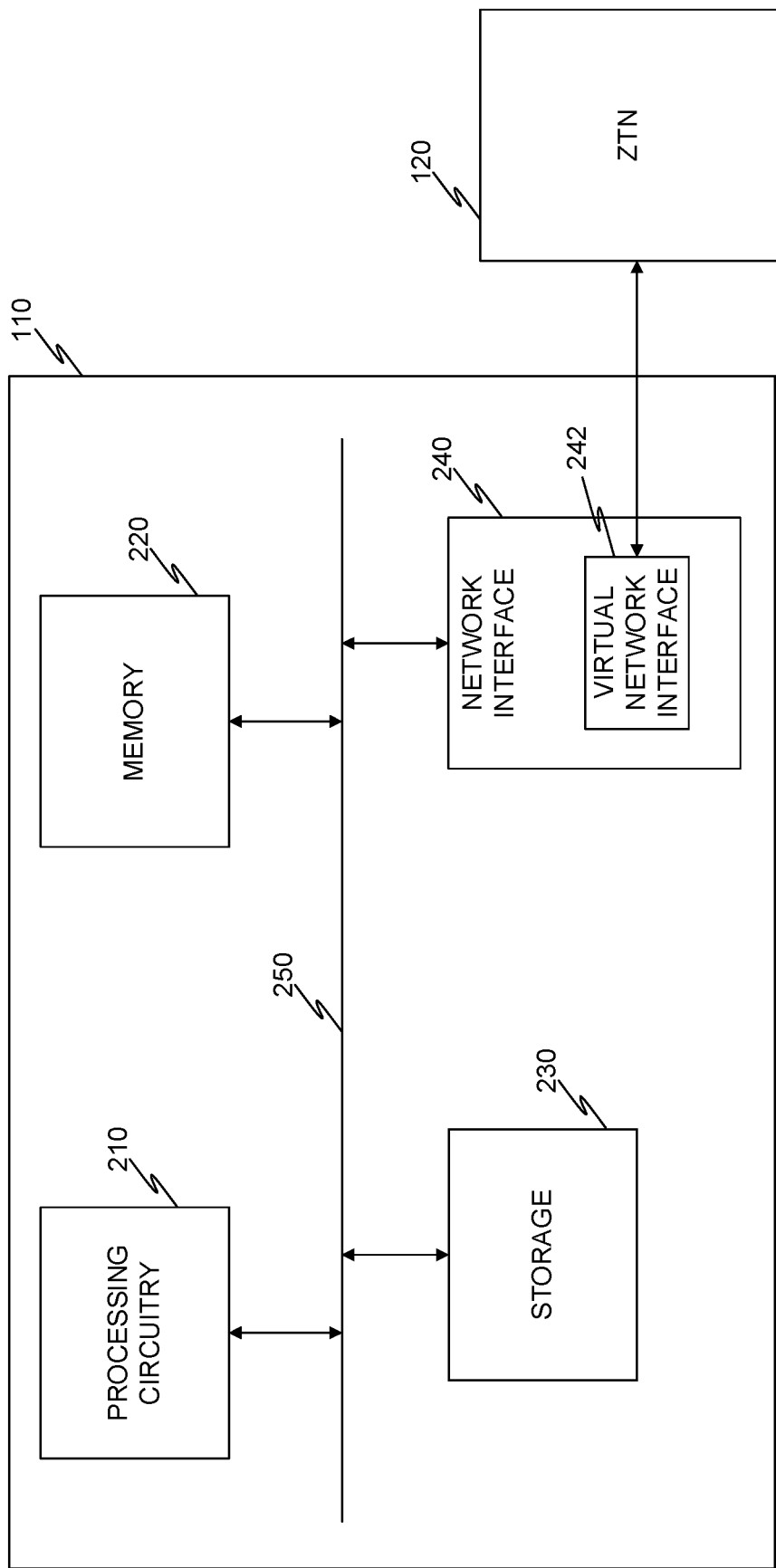
FIG. 2 is an example schematic diagram of a client device according to an embodiment.

FIG. 2 is an example schematic diagram of a client device 110 according to an embodiment. The client device 110 includes a processing circuitry 210 coupled to a memory 220, a storage 230, and a network interface 240. In an embodiment, the components of the client device may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 220 may be volatile (e.g., random access memory, etc.), non-volatile (e.g., read only memory, flash memory, etc.), or a combination thereof.

In one configuration, software for implementing one or more embodiments disclosed herein may be stored in the storage 230. In another configuration, the memory 220 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, cause the processing circuitry 210 to perform the various processes described herein.

The storage 230 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 240 allows the client device 110 to communicate with, for example, a zero trust network (ZTN) 120. In an embodiment, the client device 110 receives an agent software from the ZTN 120. The agent software includes instructions which when executed by the processing circuitry 210 of the client device 110 configure the client device 110 to realize a virtual network interface (VNI) 242. The instructions, when executed, may further configure the client device 110 to communicate exclusively through the VNI 242. In an embodiment the VNI 242 includes a routing table based on a network namespace. In some embodiments, the network namespace is an isolated network namespace. In certain embodiments, the agent software may exclusively update the routing table to expose various resources.

For example, the agent software may update the routing table to indicate that a resource (e.g., a webserver) has an IP address 10.0.0.115. In practice, the resource has a different address which is on a local private network (e.g., private network 120 of FIG. 1 above). When the client device 110 generates a packet directed at that address, the VNI 242 allows it to pass and sends the packet to the ZTN 120 for resolving. In an embodiment, the packet may be altered to include an IP address of the ZTN 120, an IP address of the resource (i.e., the different address), and the like. For the client device 110, the resource is therefore seen as a resource accessible on a local network, while in practice it is only accessible through the ZTN 120. Using this technique, any resource can be mapped through the VNI 242 to be exposed to the client device 110. Resources from public networks, from private networks, and both, can be exposed using this technique. This is advantageous, as it provides additional functionality and access to the client device 110.

It should be understood that the embodiments described herein are not limited to the specific architecture illustrated in FIG. 2, and other architectures may be equally used without departing from the scope of the disclosed embodiments.

Figure 3:
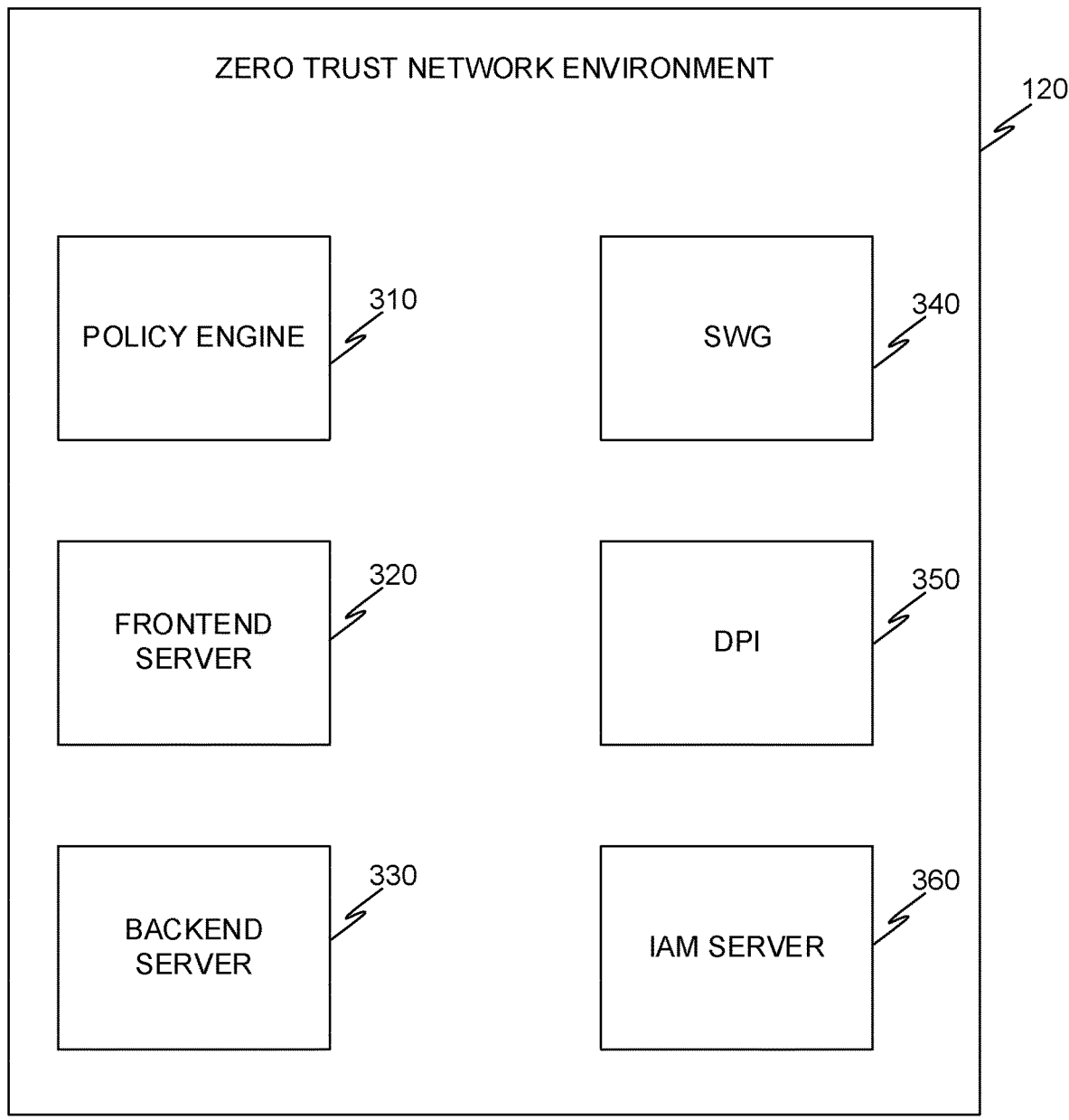
FIG. 3 is an example of a schematic diagram of zero trust network, utilized to describe an embodiment.

FIG. 3 is an example of a schematic diagram of zero trust network 120, utilized to describe an embodiment. The zero trust network (ZTN) 120 includes workloads, such as a policy engine 310, a frontend server 320, a backend server 330, a secure web gateway (SWG) 340, a deep packet inspection (DPI) unit 350, and an identity and access management (IAM) server 360. In an embodiment, the ZTN 120 may be implemented as a VPC on a cloud computing environment, such as AWS. In an embodiment, the workloads may each be implemented: on a bare metal machine, as a virtual machine, as a container, as a serverless function, and as any combination thereof.

A user device connecting to the ZTN 120 may be directed to the frontend server 320. The frontend server 320 is configured to receive communication from a user device, such as user device 110 of FIG. 1, send communication to the user device, and communicate with other components of the ZTN 120, such as the backend server 330, the SWG 340, the policy engine 310, and the IAM server 360.

In an embodiment, the frontend server 320 is configured to generate a request for credentials of a user account. Credentials may include, for example, a username, password, cryptographic key, secret, one time passcode (OTP), biometric information, and the like. In an embodiment, the credentials are supplied to an IAM server 360. The IAM server 360 may authenticate the credentials. In an embodiment, the IAM server 360 may issue a multi-factor authentication (MFA) challenge. The challenge may include a request to receive additional credentials, for example, by sending a unique PIN, a temporary PIN, and the like, to a predetermined mobile phone number associated with a user account supplying the credentials from the user device.

In certain embodiments, the frontend server 320 is configured to provide to a user device, in response to successfully authenticating credentials provided by the user device, an agent software. The agent software, when executed by a processing unit of the user device, may configure the user device to perform the methods described in more detail herein.

A backend server 330 is configured to connect to a private network, for example via a connector application which is deployed in the private network. The private network is a network which is external to the ZTN 120, and is not a public network. The backend server 330 may be configured to communicate with the frontend server 320 in order to establish a communication line between a client device, to the frontend server, to the backend server, to a resource in a private network.

A secure web gateway (SWG) 340 is configured to perform actions on network traffic received from a user device. Actions may include, for example, filtering uniform resource locators (URLs), content inspection, policy enforcement, malicious code detection, and providing application controls for web-based applications, such as instant messaging applications. In an embodiment, the SWG 340 may be configured to receive incoming network traffic, e.g., IP packets, from the frontend server 320. The incoming network traffic may be filtered, for example based on a policy retrieved from a policy engine 310. The policy engine 310 is configured to store thereon policies relating to user accounts, IP addresses, domain catalogs, and the like. In certain embodiments, the SWG 340 is further configured to initiate inspection of network traffic, for example by providing an IP packet to the DPI 350. The DPI 350 is configured to inspect network traffic content, for example by performing signature matching to detect network attacks, block certain protocols, and the like.

In some embodiments, the SWG 340 may determine when to provide network traffic to the DPI 350, for example based on a policy retrieved from the policy engine 310. This may be beneficial as performing a DPI on every packet may lead to network congestion due to a bottleneck on the DPI unit 350. The SWG 340 may be configured to read only a header of a packet, and determine if the packet should be provided to the DPI 350, based on the header information and a policy retrieved from the policy engine 310.

Figure 4:
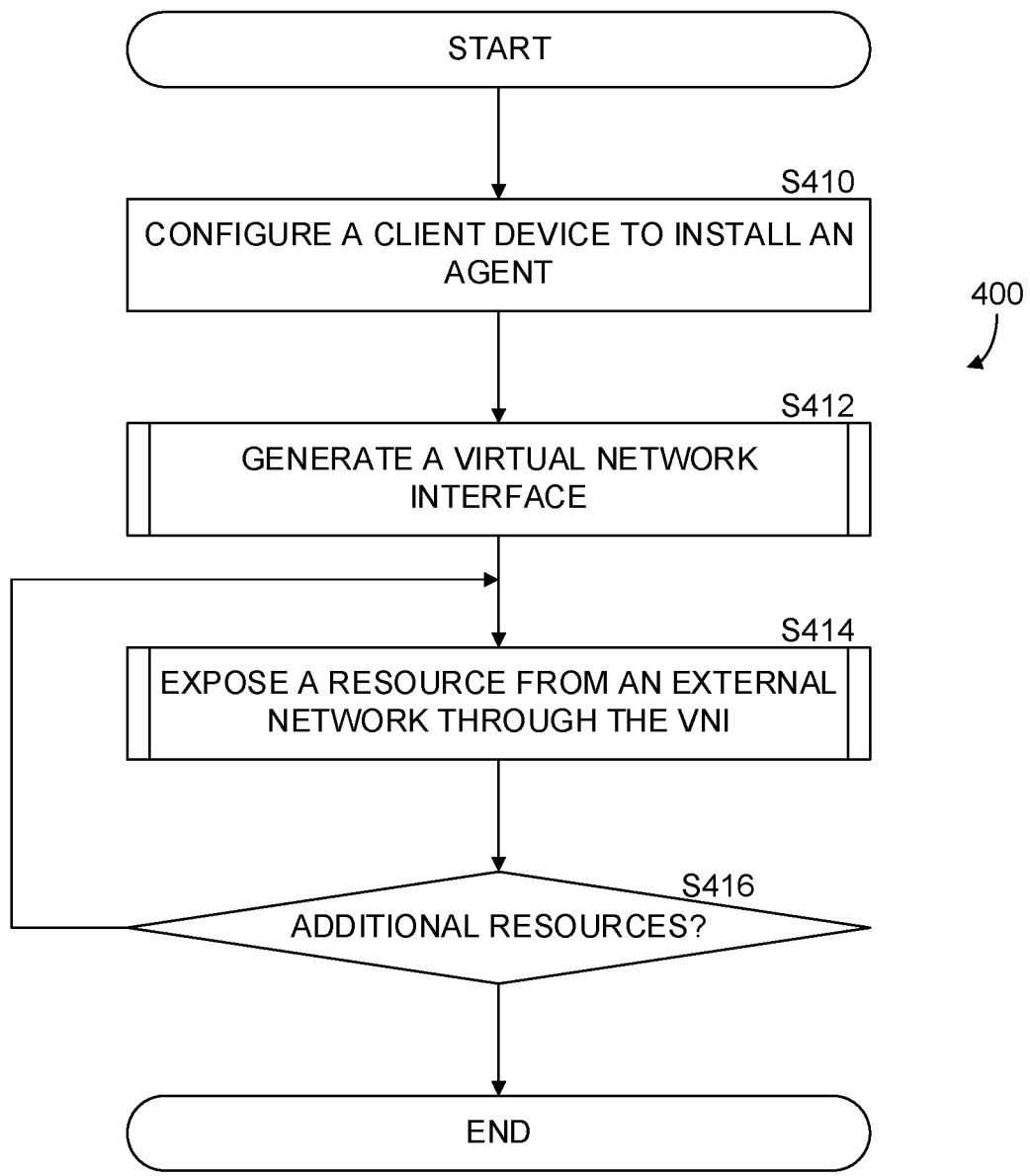
FIG. 4 is an example flowchart of a method for providing a secure web gateway over a zero trust network environment to a client device, implemented in accordance with an embodiment.

FIG. 4 is an example flowchart 400 of a method for providing a secure web gateway over a zero trust network environment to a client device, implemented in accordance with an embodiment.

At S410, a software agent is sent to a client device. The software agent includes instructions, which when executed by a processing unit of the client device configure the client device to perform the steps detailed in this method.

At S412, a virtual network interface (VNI) is generated. In an embodiment the VNI includes a routing table based on a network namespace. In some embodiments, the network namespace is an isolated network namespace. The client device may be assigned a name in the namespace, which allows the client device to communicate over the VNI with other resources which have a name in the VNI namespace.

At S414, a resource is exposed through the VNI. In certain embodiments, the routing table may be updated to expose various resources. For example, the routing table may be updated to indicate that a resource (e.g., a webserver) is accessible by an IP address 10.0.0.115. In practice, the resource has a different address which is on a local private network (e.g., private network 120 of FIG. 1 above). When the client device generates a packet directed at that address, the VNI allows it to pass and sends the packet to a zero trust network (ZTN) for resolving. In an embodiment, the packet may be altered to include an IP address of the ZTN, an IP address of the resource (i.e., the different address), and the like.

For the client device, the resource is therefore seen as a resource accessible on a local network, as the VNI exposes the resource as though it is on the same local network as the client device, while in practice it is only accessible through the ZTN. This provides the security of a zero trust network which is then able to implement a secure web gateway (SWG), in addition to providing a seamless user experience. In an embodiment, a resource may be exposed from a private network, from a public network, and from combinations thereof. In certain embodiments, a request may be received, for example from the client device, to expose another resource (i.e., assign another resource a name in the namespace of the VNI).

At S416, a check is performed to determine if another resource should be exposed to the client device. If yes execution may continue at S414, otherwise execution may terminate.

Figure 5:
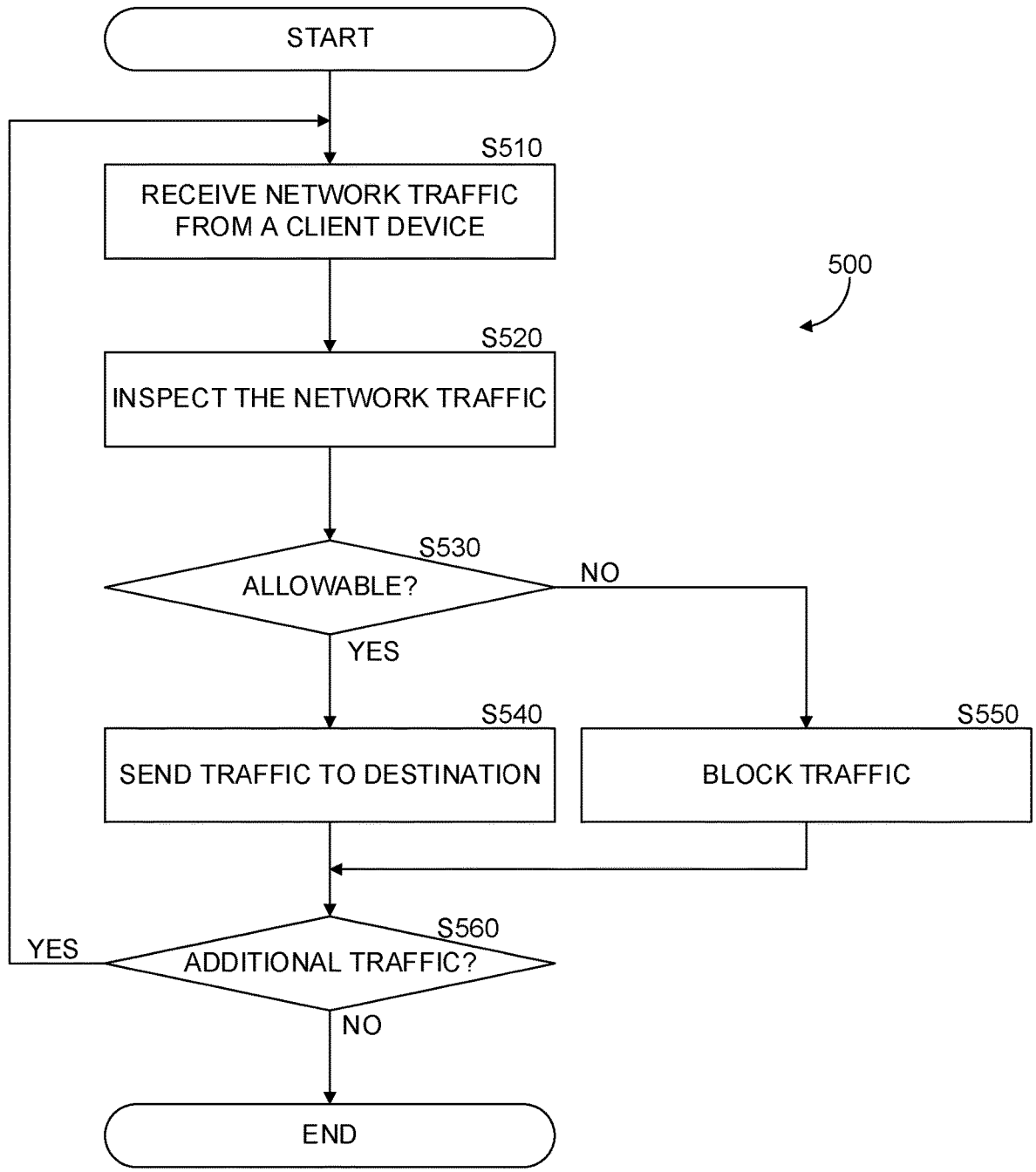
FIG. 5 is a flowchart of a method for directing network traffic through a secure web gateway of a zero trust network to a resource, implemented in accordance with an embodiment.

FIG. 5 is a flowchart of a method for directing network traffic through a secure web gateway of a zero trust network to a resource, implemented in accordance with an embodiment.

At S510, network traffic is received from a client device. Network traffic may include, for example, IP packets having a source, a destination, and a payload. In an embodiment, the client device is configured to communicate using a virtual network interface (VNI), wherein a resource is exposed to the client device through the VNI. A resource may be deployed in a private network, a public network, and in a combination thereof. A resource may be a web application, an RDP server, an SSH server, a file server, an object database, a transactional database, a SQL database, a NoSQL database, a web server, a data repository, and the like.

At S520, the network traffic is inspected. In an embodiment, inspecting network traffic includes reading a header of an IP packet. For example, a source address, destination address, and packet size, may be read. In certain embodiments, a payload of the IP packet may be provided to a deep packet inspection (DPI) unit. The DPI unit is configured to read the content of the payload, and check, for example, for cybersecurity threats, illegal content (e.g., pirated software), forbidden content (e.g., confidential information), and the like.

At S530, a check is performed to determine if the network traffic is allowed traffic. In an embodiment, allowed traffic is network traffic which is allowed based on a policy, for example retrieved from a policy engine. For example, the inspected network traffic may be matched to a policy to determine if it is allowable. A routing table may be used to determine if network traffic is allowed. In certain embodiments, network traffic may be blocked, or partially blocked, for a predefined timeframe, for example based on previous network traffic. For example, if a user device downloaded content from a private network, and is requesting to upload a content to a public network within an amount of time which is less than a predetermined amount of time (e.g., ten minutes), a policy may determine that such a request should be blocked. If the traffic is allowable, execution continues at S540. If the network traffic is not allowable, execution continues at S550.

At S540, the network traffic is sent to the resource. In an embodiment, an address of the resource is determined by reading a header of an IP packed from the network traffic. In certain embodiments, the network traffic may be modified, to indicate to the resource that a response should be sent to the ZTN, rather than sent to the client device.

At S550, the network traffic is blocked. In an embodiment, a notification may be generated and sent to the user device to indicate that the request associated with the network traffic was blocked.

At S560, a check is performed to determine if additional network traffic is received. If yes execution continues at S510. If no additional network traffic is received, for example because the connection with the zero trust network environment was terminated, execution may terminate.

Figure 6:
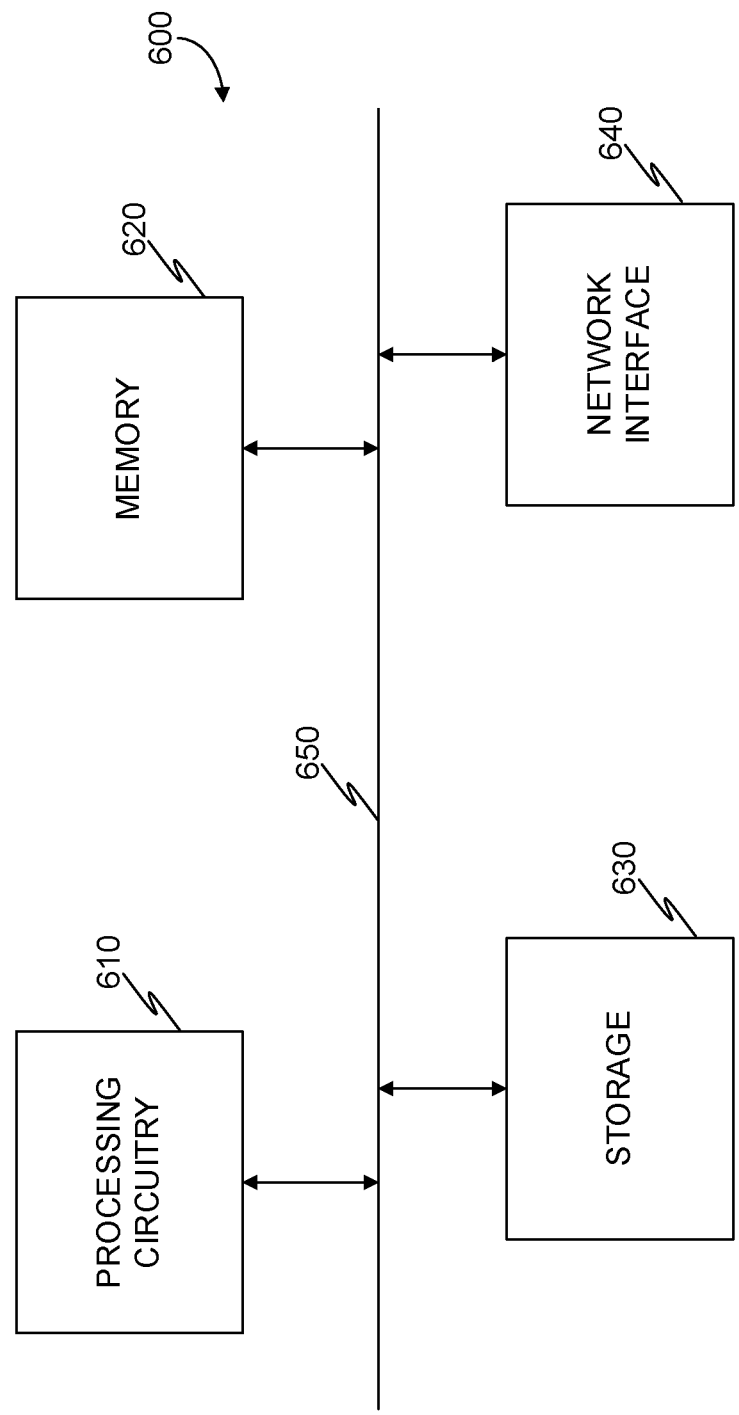
FIG. 6 is an example schematic diagram of a secure web gateway according to an embodiment.

FIG. 6 is an example schematic diagram of a secure web gateway 340 according to an embodiment. The secure web gateway (SWG) 340 includes a processing circuitry 610 coupled to a memory 620, a storage 630, and a network interface 640. In an embodiment, the components of the SWG 340 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the secure web gateway 340 to communicate with, for example, a client device, a frontend server, a backend server, a DPI unit, a policy engine, and the like.

It should be understood that the embodiments described herein are not limited to the specific architecture illustrated in FIG. 6, and other architectures may be equally used without departing from the scope of the disclosed embodiments.

Furthermore, the frontend server, the backend server, the DPI unit, the policy engine, and the like, may be implemented using an architecture similar to the one described in FIG. 6 without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
generating a virtual network interface having a namespace with a plurality of names, wherein a first name of the namespace is assigned to a client device;
assigning a second name of the namespace to a resource accessible to the client device through a zero trust network environment, wherein the resource is deployed in a secure network environment;
configuring the client device to communicate only through the virtual network interface;
inspecting network traffic received from the client device;
determining a destination of the network traffic;

sending the network traffic to the destination in response to determining that the network traffic is allowable based on a policy of the zero trust network environment; and altering a packet of the network traffic so that a response from the resource is directed to the zero trust network environment instead of the client device.

2. The method of claim 1, further comprising:
receiving credentials of a user account associated with the user device;
providing access to the resource through the zero trust network in response to authenticating the received credentials.

3. The method of claim 1, wherein the virtual network interface further includes a routing table.

4. The method of claim 1, further comprising:
performing a deep packet inspection on the network traffic.

5. The method of claim 1 wherein the resource is deployed in any one of: a private network, a public network, and any combination thereof.

6. The method of claim 1, wherein the resource is any one of: a web application, a remote desktop protocol (RDP) server, a secure shell (SSH) server, a file server, an object database, a transactional database, a SQL database, a NoSQL database, a web server, a data repository, and any combination thereof.

7. The method of claim 1, further comprising:
assigning a third name of the namespace to another resource accessible to the client device through a zero trust network environment, wherein the resource is deployed in a private network and the another resource is deployed in a public network; and
blocking network traffic to the another resource in response to determining that the client device requested content from the resource within a time period which is less than a predefined time period.

8. The method of claim 1, wherein the zero trust network environment includes any one of: a frontend SSH server, a frontend RDP server, an access portal server, a backend server, and any combination thereof.

9. A non-transitory computer-readable medium comprising instructions executable by processing circuitry to:
assign a first name of a namespace of a virtual network interface having to a client device, the namespace having a plurality of names, and wherein the client device is configured to communicate only through the virtual network interface;
assign a second name of the namespace to a resource accessible to the client device through a zero trust network environment, wherein the resource is deployed in a secure network environment;
inspect network traffic received from the client device;
determine a destination of the network traffic;
send the network traffic to the destination in response to determining that the network traffic is allowable based on a policy of the zero trust network environment; and
alter a packet of the network traffic so that a response from the resource is directed to the zero trust network environment instead of the client device.

10. The non-transitory computer-readable medium of claim 9, wherein the instructions are executable to:
assign a third name of the namespace to another resource accessible to the client device through a zero trust network environment, wherein the resource is deployed in a private network and the another resource is deployed in a public network; and
block network traffic to the another resource in response to determining that the client device requested content from the resource within a time period which is less than a predefined time period.

11. The non-transitory computer-readable medium of claim 9, wherein the instructions are executable to:
receive credentials of a user account associated with the user device; and
provide access to the resource through the zero trust network in response to authenticating the received credentials.

12. The non-transitory computer-readable medium of claim 9, wherein the virtual network interface further includes a routing table.

13. The non-transitory computer-readable medium of claim 9, wherein the instructions are executable to:
perform a deep packet inspection on the network traffic.

14. A system comprising:
processing circuitry; and
a non-transitory machine readable storage medium comprising instructions executable by the processing circuitry to:
assign a first name of a namespace of a virtual network interface to a client device, the namespace having a plurality of names, and wherein the client device is configured to communicate only through the virtual network interface;
assign a second name of the namespace to a resource accessible to the client device through a zero trust network environment, wherein the resource is deployed in a secure network environment;
inspect network traffic received from the client device;
determine a destination of the network traffic;
send the network traffic to the destination in response to determining that the network traffic is allowable based on a policy of the zero trust network environment; and
alter a packet of the network traffic so that a response from the resource is directed to the zero trust network environment instead of the client device.

15. The system of claim 14, wherein the memory contains further instructions which when executed by the processing circuitry further configure the system to:
receive credentials of a user account associated with the user device; and
provide access to the resource through the zero trust network in response to authenticating the received credentials.

16. The system of claim 14, wherein the virtual network interface further includes a routing table.

17. The system of claim 14, wherein the memory contains further instructions which when executed by the processing circuitry further configure the system to:
perform a deep packet inspection on the network traffic.

18. The system of claim 14, wherein the resource is deployed in any one of: a private network, a public network, and any combination thereof.

19. The system of claim 14, wherein the resource is any one of: a web application, a remote desktop protocol (RDP) server, a secure shell (SSH) server, a file server, an object database, a transactional database, a SQL database, a NoSQL database, a web server, a data repository, and any combination thereof.

20. The system of claim 14, wherein the memory contains further instructions which when executed by the processing circuitry further configure the system to:

assign a third name of the namespace to another resource accessible to the client device through a zero trust network environment, wherein the resource is deployed in a private network and the another resource is deployed in a public network; and block network traffic to the another resource in response to determining that the client device requested content from the resource within a time period which is less than a predefined time period.

21. The system of claim 14, wherein the zero trust network environment includes any one of: a frontend SSH server, a frontend RDP server, an access portal server, a backend server, and any combination thereof.

\* \* \* \* \*